W. STRUBE.
TUBULAR SPRING FOR MEASURING INSTRUMENTS.
APPLICATION FILED JULY 3, 1908
912,755.
Patented Feb. 16, 1909.
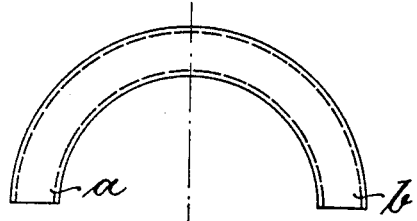
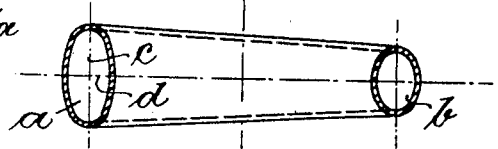
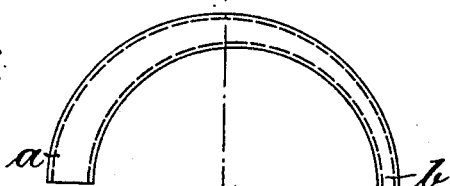
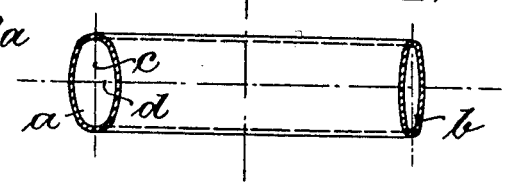
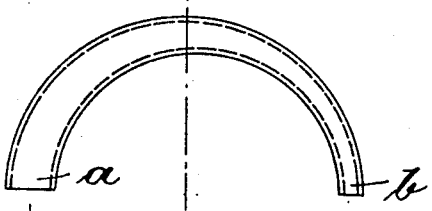
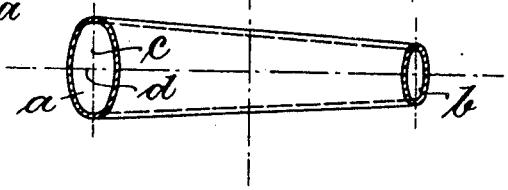
Witnesses:
Emil Kayser
Paul Wollenberg
Inventor
Wilhelm Strube.
by L. K. Böhm
Attorney.

UNITED STATES PATENT OFFICE.

WILHELM STRUBE, OF MAGDEBURG-BUCKAU, GERMANY.

TUBULAR SPRING FOR MEASURING INSTRUMENTS.

No. 912,755.　　　Specification of Letters Patent.　　　Patented Feb. 16, 1909.

Application filed July 3, 1908. Serial No. 441,763.

*To all whom it may concern:*

Be it known that I, WILHELM STRUBE, a subject of the King of Prussia, German Emperor, and resident of Magdeburg-Buckau, in the German Empire, have invented certain new and useful Improvements in Tubular Springs for Measuring Instruments, of which the following is an exact specification.

This invention relates to the tubular springs used in measuring instruments such as the well known Bourdon pressure gages.

The object of the present invention is to provide an improved form of spring which shall give an increased moment of resistance when partially unwound by the action of the internal pressure or vacuum.

Hitherto the tubes have been made of equal cross section throughout their length but according to the present invention the cross section is altered toward the end.

The invention is illustrated in three modifications in the accompanying drawings.

Figure 1 represents a semicircular length of tube-spring, Fig. 1ª is a cross section of the tube taken on a diameter of Fig. 1, Figs. 2 and 2ª and 3 and 3ª are views similar to Figs. 1 and 1ª.

According to the form illustrated in Fig. 1 the well known form of oval-shaped Bourdon tubular spring is shown as arranged tapered from the end $a$ to the end $b$. The tapering is effected by reducing the larger diameter $c$ while the shorter diameter $d$ remains constant.

In Figs. 2 and 2ª the oval tube is shown with the larger diameter $d$ constant and the smaller diameter $e$ reduced for the purpose of increasing the moment of resistance of the tube towards the end $b$. In Figs. 3 and 3ª a form is illustrated in which both the diameters of the oval tube are altered.

If desired the diameters of the oval tube may remain constant or may increase toward the end $b$ and the walls of the tubes may be made thicker in order to provide the necessary increase in the moment of resistance.

I claim:—

1. A curved tubular spring of oval cross section for use in gages and like measuring instruments, gradually tapering from one end to the other.

2. A curved tubular spring of oval cross section for use in gages and like measuring instruments, gradually tapering from one end to the other so that its successive cross sections become gradually less toward the smaller end.

3. A curved tubular spring of oval cross section for use in gages and like measuring instruments gradually tapering from one end to the other so that the successive diameters of the oval become gradually shorter toward the smaller end.

In witness whereof I have hereunto set my hand in the presence of two witnesses.

WILHELM STRUBE.

Witnesses:
　J. L. A. BURRELL,
　BENNO KILCIG.